US005989720A

United States Patent [19]

Taniyama

[11] Patent Number: 5,989,720
[45] Date of Patent: Nov. 23, 1999

[54] ELECTROMAGNETIC WAVE SHIELD MATERIAL COMPOSITION AND ELECTROMAGNETIC WAVE SHIELD PRODUCT INCLUDING SUCH MATERIAL COMPOSITION

[75] Inventor: Takanobu Taniyama, Kamigun, Japan

[73] Assignee: Taniyama & Co., Ltd., Kouchi, Japan

[21] Appl. No.: 08/997,949

[22] Filed: Dec. 24, 1997

[30] Foreign Application Priority Data

Dec. 25, 1996 [JP] Japan .................................... 8-346040

[51] Int. Cl.[6] ............................... B32B 9/06; C04B 35/00

[52] U.S. Cl. ......................... 428/450; 428/689; 252/62.3; 252/478; 252/508; 252/512; 523/136

[58] Field of Search .................................... 428/429, 432, 428/447, 450, 454, 469, 689; 252/62.3, 478, 508, 512; 174/35; 523/136; 524/779, 441, 786

[56] References Cited

U.S. PATENT DOCUMENTS

| | | | |
|---|---|---|---|
| 3,090,691 | 5/1963 | Weyer | 106/39 |
| 4,474,676 | 10/1984 | Ishino et al. | 252/62.54 |
| 4,508,640 | 4/1985 | Kanda et al. | 252/503 |
| 5,066,692 | 11/1991 | Isawa et al. | 523/458 |
| 5,272,239 | 12/1993 | Jensen | 528/9 |
| 5,324,766 | 6/1994 | Ikejiri et al. | 524/433 |
| 5,458,967 | 10/1995 | Kanno et al. | 428/344 |
| 5,462,771 | 10/1995 | Motoki et al. | 427/537 |
| 5,741,842 | 4/1998 | Huggins et al. | 524/500 |

FOREIGN PATENT DOCUMENTS

| | | |
|---|---|---|
| 2 406 870 | 10/1977 | France . |
| 2 007 480 | 10/1977 | United Kingdom . |

OTHER PUBLICATIONS

Database WPI, Section Ch, Week 8550, Derwent Publications Ltd., London, GB; Class A60, AN85–312676 XP002057763 & JP 60 071 649 A (Toshiba KK), Apr. 23, 1995 * abstract *.

Database WPI, Section Ch, Week 9518, Derwent Publications Ltd., London, GB; Class A28, AN 95–135030 XP002057762 & JP 07 058 490 A (Kitagawa Kogyo KK), Mar. 3, 1995 * abstract *.

Database WPI, Section Ch, Week 8901, Derwent Publications Ltd., London, GB; Class A32, AN 89–004363 XP002057764 & JP 63 283 906 A (Asahi Cork Kogyo KK), Nov. 21, 1998 * abstract *.

Patent Abstracts of Japan, vol. 013, No. 348 (E–799), Aug. 4, 1989 & JP 01 107599 A (Seiko Epson Corp), Apr. 25, 1989 * abstract *.

Database WPI, Section Ch, Week 7934, Derwent Publications Ltd., London, GB; Class K07, AN 79–62413B XP002057765 & JP 54 088 819 A (Sumitomo Light Metal Ind Co), Jul. 14, 1979 * abstract *.

Database WPI, Section Ch, Week 8027, Derwent Publications Ltd., London, GB; Class A26, An 80–47034C XP002057766 & JP 55 066 799 A (Matsushita Elec Ind Co Ltd), May 20, 1980 * abstract *.

*Primary Examiner*—Timothy Speer
*Assistant Examiner*—Stephen Stein
*Attorney, Agent, or Firm*—Wenderoth, Lind & Ponack, L.L.P.

[57] ABSTRACT

An electromagnetic wave shield material composition and an electromagnetic wave shield product including such material composition are disclosed, which may be used on an electric or electronic device such as a portable telephone so as to attenuate or shield any electromagnetic waves generated therefrom. Specifically, the electromagnetic wave shield material composition comprises a primary element including a mixture composed of 10 to 90% by weight of silicon resin and 90 to 10% by weight of baked ceramics material, and a secondary element including a mixture composed of aluminum powder and stainless metal powder. Alternatively, the secondary element may include a mixture composed of paint, aluminum powder and/or stainless metal powder. The electromagnetic wave shield product has the form of a thin sheet of 0.5 mm to 2.0 mm thick, formed by shaping the above material composition such as by press. Alternatively, the thin sheet may have an additional thin aluminum film layer deposited on one side thereof.

15 Claims, 1 Drawing Sheet

ELECTROMAGNETIC WAVE SHIELD MATERIAL COMPOSITION AND ELECTROMAGNETIC WAVE SHIELD PRODUCT INCLUDING SUCH MATERIAL COMPOSITION

FIELD OF THE INVENTION

The present invention relates to an electromagnetic wave shield material composition and an electromagnetic wave shield product including such material composition, specifically designed to attenuate or shield any electromagnetic waves generated from electric or electronic devices, such as portable telephone, that are commercially available for the daily use.

DESCRIPTION OF THE PRIOR ART

An aluminum alloy material that is capable of shielding neutron is known to the art, which includes an aluminum alloy core composed of 0.4 to 5.5% of boron, 0.3 to 2.0% of magnesium, 0.2 to 1.8% of silicon, and, for the remainder, aluminum, and an outer layer of pure aluminum film disposed on the opposite sides of the core. This conventional material is disclosed in Japanese patent application now open to the public inspection under No. Showa 54-88819. A silicon composition that is specifically capable of shielding X-ray radiation is also known, as disclosed in Japanese patent application now open to the public inspection under No. Showa 55-66799. This silicon composition comprises a silicon composition including a platinum or platinum compound acting as flame retarder, and any one of metal oxides such as tungsten oxide.

Those conventional compositions as proposed in the above Japanese patent applications are based on the recognition that the aluminum alloy is particularly effective in shielding neutron, and that the metal oxides such as tungsten oxide, titanium oxide and the like are particularly effective in shielding X-ray radiation. They have their own particular applications as the shielding material used in the nuclear reactor and as the silicon rubber compound, respectively. In those recent years, the portable telephones and other home electric or electronic devices have become popular rapidly and have been used widely. It may be noted that those devices incorporate a short-wave transmitter that generates electromagnetic waves. To date, no effective means has not yet been proposed to shield such electromagnetic waves. Particularly, it is reported that the electromagnetic waves generated from the portable telephone may potentially cause cancers, and there is some likelihood that they may be harmful to the health of a human being. For this reason, a demand arises for any means that protects the human body against the electromagnetic waves from the portable telephone and similar devices.

For example, an apron or filter is at present commercially available, and is advertised to the public as being "capable of shielding the electromagnetic waves". In Japan, the Consumers Organization tested those commercially available devices, and reports that although they may shield the electric fields, they cannot shield any electromagnetic waves. This means that at present, there is no effective means available for protecting the human body against the electromagnetic waves that may cause any possible physical damages. Under the circumstances, the only way to avoid those damages that is now available is to keep as clear of an electric or electronic device as possible that generates electromagnetic waves, or else to attempt to use such electric or electronic device as few times or hours as possible. This suggestion is an indirect solution, however. Usually, when using the portable telephone, for example, a user places it near his head or brain. The result is that the electromagnetic waves generated from the device may have the direct effect upon the brain cells. Unfortunately, all users are vulnerably exposed to the electromagnetic waves from the portable telephone, that is, they are not physically shielded from those waves.

SUMMARY OF THE INVENTION

The inventor of the current application has made a number of studies, and it has been discovered that the baked ceramics material provides the functions of shielding, attenuating, or absorbing the electromagnetic waves. Finally, the present invention is based upon the results of the further studies that the same inventor has made.

The present invention is directed to an electromagnetic wave shield material composition and an electromagnetic wave shield product including such material composition. The electromagnetic wave shield material composition according to one preferred embodiment of the present invention may essentially comprise a primary element including a mixture composed of 10 to 90% by weight of silicone resin and 90 to 10% by weight of baked ceramics material, and a secondary element including a mixture composed of an aluminum powder and/or stainless metal powder. Specifically, the secondary element may have the proportion of 3 to 10% by weight in relation to the primary element. When the aluminum powder and stainless metal powder are both used, they may contain 10 to 90% by weight of aluminum powder and 90 to 10% by weight of stainless metal powder.

The electromagnetic wave shield material composition according to another preferred embodiment of the present invention may essentially comprise a primary element including a mixture composed of 10 to 90% by weight of silicone resin and 90 to 10% by weight of baked ceramics material, and a secondary element composed of paint and aluminum powder and/or stainless metal powder. Specifically, the secondary element may have the proportion of 3 to 10% by weight with regard to the primary element. When the paint and aluminum powder are used or when the paint and stainless metal powder are used, they may contain 10% to 90% by weight of paint and 90 to 10% by weight of aluminum powder or stainless metal powder. When the paint, aluminum powder and stainless metal powder are all used, they may contain 10 to 80% by weight of paint, 10 to 80% by weight of aluminum powder, and 10 to 80% by weight of stainless metal powder.

The stainless metals may include any one or ones selected from the group consisting of platinum, platinum compound, stainless steel, titanium, and magnesium. The baked ceramics material may include any one or ones selected from the group consisting of granite, basalt, and sand. The baked ceramics material may be obtained by baking one or ones of such elements at 650 degrees C to 1200 degrees C for 6 or more hours, allowing the result to cool to the ambient temperature, and repeating the previous steps at least one more time under the same conditions.

In the embodiments described above, the primary element includes a mixture of 10 to 90% by weight of silicone resin and 90 to 10% by weight of baked ceramics. If either of those components is less than 10% by weight, its ability to shield the electromagnetic waves will undesirably drop drastically. If either is more than 90% by weight, it may undesirably tend to shield even the audible voice frequencies through the portable telephone, when the present invention is incorporated with the portable telephone.

In order to provide the higher electromagnetic wave shield performance, the primary element should preferably include 30 to 70% by weight of silicone resin and 70 to 30% by weight of baked ceramics material.

The electromagnetic wave shield material composition according to the present invention may essentially comprise the required primary components as described above, and optionally, any of (a) aluminum powder, (b) stainless metal powder, (c) a mixture of aluminum powder and stainless metal powder, (d) a mixture of paint and aluminum powder, (e) a mixture of paint and stainless metal powder, and (f) a mixture of paint, aluminum powder and stainless metal powder. Any combination of the primary and secondary components may provide the good electromagnetic wave shield performance. The highest performance may be provided by combining the required primary components with the secondary components (f) listed above, and the next highest performance may be provided by combining the required primary components with the secondary components (d) or (e) listed above. The combination with (c) follows next, followed by the combination with (a) or (b). Specifically, the performance (i.e., the ability to attenuate or absorb the electromagnetic waves) that may be provided by the composition that includes no paint may be decreased by 20 to 10%, as compared with that for the composition including the paint.

According to the present invention, the secondary components should preferably have the proportion of 3 to 10% by weight in relation to the primary components, whether they may be an aluminum powder alone, a stainless metal powder alone, a mixture of aluminum powder and stainless metal powder, a mixture of paint and aluminum powder, a mixture of paint and stainless metal powder, or a mixture of paint, aluminum powder and stainless metal powder. If they are less than 3% by weight, the electromagnetic wave shield performance may undesirably be reduced. Reversely, if they are more than 10% by weight, the audible voice frequencies through the portable telephone may undesirably be shielded, when the present invention is incorporated with the portable telephone.

When the aluminum powder and stainless metal powder are both used, the aluminum powder should preferably be 10 to 90% by weight, and the stainless metal powder should preferably be 90 to 10% by weight. If either of them is less than 10% by weight, the electromagnetic wave shield performance may undesirably be reduced. If either of them is more than 90% by weight, the audible voice frequencies through the portable telephone may undesirably be shielded, when the present invention is incorporated with the portable telephone.

When a mixture of paint and aluminum powder or stainless metal powder is used, the paint should preferably be 10 to 90% by weight, and the aluminum powder or stainless metal powder should preferably be 90 to 10% by weight. If either of the paint and the aluminum powder or stainless metal powder is less than 10% by weight, the electromagnetic wave shield performance may undesirably be reduced. Similarly, if either is more than 90% by weight, the audible voice frequencies through the portable telephone may undesirably be shielded.

When a mixture of paint, aluminum powder and stainless metal powder is used, the paint should preferably be 10 to 80% by weight, the aluminum powder should preferably be 10 to 80% by weight, and the stainless metal powder should preferably be 10 to 80% by weight. If either of them is less than 10% by weight, the electromagnetic wave shield performance may undesirably be reduced. If either of them is more than 80% by weight, the audible voice frequencies through the portable telephone may undesirably be shielded.

The baked ceramics material that forms one of the required primary components may include one or more selected from the group consisting of granite, basalt and sand, and may be obtained by baking such components 650 degrees C to 1200 degrees C for six or more hours, allowing the same to cool to the ambient temperature, and repeating the previous steps at least one more time under the same conditions. It should be noted that the baking temperature of between 650 degrees C and 1200 degrees C is selected because the physical property of the material can remain stable after the baking process at the temperature range. The baking step followed by the cooling step may be repeated two or more times so that the interrelationship between the different components contained in a particular substance (such as granite) can be maintained uniformly and consistently.

An electromagnetic wave shield product according to the present invention is now described. This product, which usually has a thin sheet form, may be obtained by using the electromagnetic wave shield material composition that has been described so far. Specifically, it may be obtained by shaping the material composition into a thin sheet form such as by press. Alternatively, it may have an additional aluminum film layer deposited on one side thereof.

The sheet form thus obtained may preferably have the thickness of 0.5 to 2.0 mm which is enough to meet any particular needs. The shape and size (area) of the sheet form may be varied, depending upon the physical dimensional requirements of a particular device, such as portable telephone, on which it is to be mounted. The sheet may be mounted (such as by using an adhesive) on the area of the device where the electromagnetic waves are generated.

As described, the sheet may have an additional aluminum film layer deposited on one side thereof. For example, an aluminum foil or film that is obtained by lamination may be deposited on one side of the sheet. It is not essential to the present invention to provide such aluminum film layer because the intended electromagnetic wave shield performance can be achieved without it. It should be noted, however, that the performance (i.e., ability to attenuate or absorb the electromagnetic waves) that may be achieved when the additional aluminum film layer is present may be increased by a factor of 40 to 50%, as compared with the performance achieved without aluminum film layer.

The electromagnetic wave shield material composition of the present invention may provide the highly efficient and reliable means for shielding, absorbing, or attenuating the electromagnetic waves generated from the source, such as portable telephone.

So that, if the said material composition is shaped into a thin sheet, such as 0.5 mm to 2.0 mm thick, by press, etc., the said thin sheet may provide the highly performance (i.e., ability to attenuate or absorb the electromagnetic waves) in spite of the said thin thickness of 0.5 mm to 2.0 mm.

A commercially available apron or filter is known as being capable of shielding the electromagnetic waves. As mentioned earlier, it is clear that actually it only provides the capability to shield the electric fields, not to shield any electromagnetic waves. As opposed, any device, such as portable telephone, that incorporates with the electromagnetic wave shield thin sheet of the present invention provides the high electromagnetic wave attenuation rate, such as 66.1% at a distance of 5 cm away from the device, and 85.5% at a distance of 30 cm away from the device.

The electromagnetic wave attenuation rate as described herein may be obtained from the following equation:

$$\text{Attenuation rate}=\{1-10^{(A-B)/20}\}\times 100$$

where, A and B represent the values for the electromagnetic waves (in terms of dB $\mu$V) as measured under the same conditions. Specifically, A represents the value as measured when the electromagnetic wave source or device incorporates with the electromagnetic wave shield sheet of the present invention, and B represents the value as measured when the source or device does not incorporates with the present invention.

It is noted that the electromagnetic wave shield material composition and the sheet product including such material composition, according to the present invention, may provide the electromagnetic wave shield performance that can persist semi-permanently once it begins to function.

The thin sheet product is so flexible that it can be used on any type of electric or electronic device and can be adapted to any shape of such device. It may be mounted on such device by using any known attaching means, such as an adhesive. When used with such devices, it can effectively absorb or shield the electromagnetic waves generated from them.

Further, when the thin sheet product of the present invention may be mounted on a portable telephone, the electromagnetic waves generated from the telephone unit can be shielded, and any noise that may be introduced can also be reduced or eliminated so that the noise-free (clear) conversation can take place. Thus, the user can use his portable telephone more comfortably and conveniently.

BRIEF DESCRIPTION OF THE DRAWINGS

FIG. 2 (*b*) is a partly enlarged sectional view of the thin sheet product shown in FIG. 2 (*a*).

DETAILED DESCRIPTION OF THE PREFERRED EMBODIMENTS

Several preferred embodiments of the present invention are now described.

First Embodiment

An electromagnetic wave shield material composition according to the present invention essentially comprises a primary element and a secondary element. The primary element may include 50% by weight of silicone resin and 50% by weight of baked ceramics material. The baked ceramics material may include basalt, for example, and may be obtained by baking it at 1000 degrees C for eight hours, then allowing the same to cool to the ambient temperature, and by repeating the above steps at least one more time under the same conditions.

The secondary element may include 5% by weight of aluminum powder, 5% by weight of stainless steel powder, 5% by weight of a mixture composed of 50% by weight of aluminum powder and 50% by weight of stainless steel powder, 5% by weight of a mixture composed of 50% by weight of paint and 50% by weight of aluminum powder, 5% by weight of a mixture composed of 50% by weight of paint and 50% by weight of stainless steel powder, or 5% by weight of a mixture composed of 33.3 by weight of paint, 33.3% by weight of aluminum powder and 33.3% by weight of stainless steel powder. Thus, six different material compositions are provided, each including the required primary components and an optional different combination of the secondary components. The paint may be any water paint that is commercially available.

Any of the material compositions thus obtained may be shaped by press into a thin sheet having a thickness of 1 mm. The thin sheet may be cut to a sheet of any desired size, such as the size of 7 cm long, 5 mm wide and 1 mm thick. The cut sheet may be attached to a 800 MHz portable telephone near to its antenna, for example. Then, the portable telephone is powered on with its antenna extended so that the conversation can take place. During the conversation, the electromagnetic waves may be measured at a specific point 30 cm far away from the speaker of the telephone. Then, the telephone unit using the present invention and the telephone unit not using the present invention were compared, and it has been found that the former provides the electromagnetic wave attenuation rate of 78% to 90%, as compared with the latter.

The maximum attenuation effect (electromagnetic wave shield effect) may be achieved when the combination of paint, aluminum powder and stainless steel powder is added to the primary components. The minimum attenuation effect (electromagnetic wave shield effect) may be achieved when the aluminum powder or stainless steel powder alone is added to the primary components.

The telephone communication may be less noisy and better for the telephone unit using the present invention than that not using the present invention.

Second Embodiment

Figure 1:
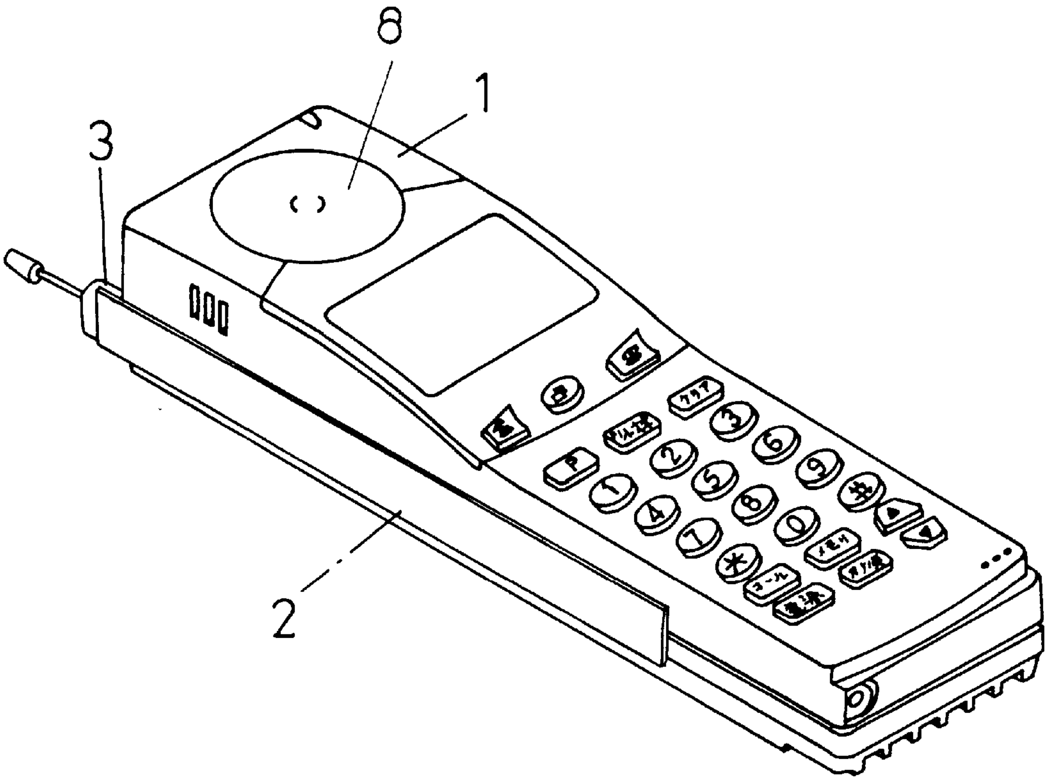
FIG. 1 is a perspective view of a portable telephone incorporating the thin sheet product according to the present invention.
Figure 2A:
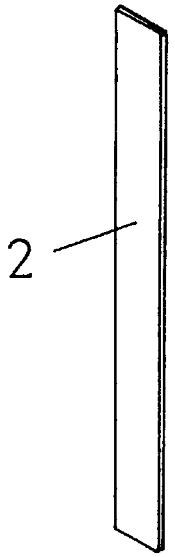
FIG. 2 (*a*) is a perspective view of the thin sheet product according to the present invention.
Figure 2B:
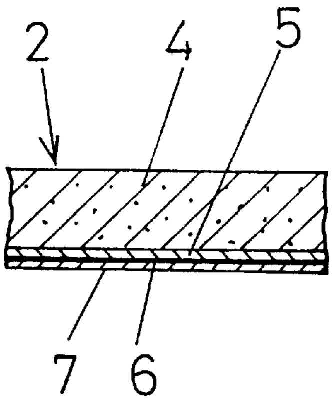

A second preferred embodiment of the present invention is described by referring to FIGS. 1 and 2.

An electromagnetic wave shield material composition may essentially comprise a primary element and a secondary element. As in the preceding embodiment, the primary element may be a mixture composed of 50% by weight of silicone resin and 50% by weight of baked ceramics material. In the current embodiment, however, the baked ceramics material may include granite, for example, and may be obtained by baking it at 1000 degrees C for seven hours, then allowing the same to cool to the ambient temperature, and by repeating the above steps at least one more time under the same conditions.

The secondary element may include a mixture composed of paint and platinum powder, having the proportion of 6% by weight with regard to the primary element. The paint may be any water paint that is commercially available. Specifically, the mixture may include 80% by weight of paint and 20% by weight of platinum powder.

The resulting material composition may be shaped by press into a thin sheet 4 of 2 mm thick.

Additionally, the thin sheet 4 may have a thin aluminum film layer 5 deposited on one side thereof. The thin aluminum film layer 5 may have an adhesive layer 6 on its outer side, on which a detachable sheet 7 may be provided. An electromagnetic wave shield sheet 2 may thus be obtained.

When this sheet 2 is used on a portable telephone 1, for example, it may be cut into a proper shape of 11 cm long and 5 mm wide, for example. Then, the detachable sheet 7 may be detached from the cut sheet 2, which may be attached to the telephone near to its antenna 3, as shown in FIG. 1.

The size of the sheet 2 may be determined, depending upon the size of a particular electric or electronic device on which the sheet 2 is to used, the side of the location where the electromagnetic waves are generated, the frequencies of the electromagnetic waves, and other factors.

When the sheet 2 is to be mounted on a portable telephone that provides a frequency of 800 MHz or 1.9 GHz, it may be cut to a shape of 11 cm long and 4 mm wide. For a 1.5-GHz portable telephone, it may be cut to a shape of 7 cm long and 4 mm wide.

The sheet 2 may have any thickness other than 2 mm, but the thickness of 2 mm is enough to shield the electromagnetic waves. Therefore, it should not be greater or smaller than 2 mm. Less than 2 mm, the electromagnetic wave shield performance might be lowered. It should preferably be at least thicker than 0.5 mm.

Test Case

For one testing, one of the sheets 2 obtained by the second embodiment described above was used, and a portable telephone that provides the electromagnetic wave frequencies of 953.53 MHz was selected and tested to check the electromagnetic wave shield performance. The detachable sheet 7 was removed from the sheet 2, which was attached to near the antenna of the telephone, as shown in FIG. 1. The measuring point was selected near the center of the speaker 8, and the electromagnetic waves were measured at a distance of 5 cm away from the telephone, and at a distance of 30 cm away from the telephone. The results are given below:

| Distance from Device | 5 cm | 30 cm |
|---|---|---|
| Sheet Used | 63.2 dB μV | 45.7 dB μV |
| Sheet Not Used | 72.6 dB μV | 62.5 dB μV |
| Attenuation Rate | 66.1% | 85.5% |

In this case, the sheet 2 was not interposed between the telephone unit and measuring point. The values for the attenuation rate were measured as given above. This means that the electromagnetic wave shield material composition or sheet product according to the present invention provides the ability to absorb and thereby attenuate the electromagnetic waves, rather than to shield those waves. Thus, it can prevent the electromagnetic waves from leaking from the interior of the device to the outside.

It is noted that the sheet 2 according to the present invention will initially remain to be inactive for about 30 minutes just after it has been mounted on a portable telephone for the first time. In other words, the sheet 2 will not exhibit its ability to absorb and thereby attenuate the electromagnetic waves sufficiently for the initial 30 minutes. It is also noted, however, that upon elapse of the initial 30 minutes, the sheet 2 will begin to exhibit its inherent ability to absorb and thereby attenuate the electromagnet waves, and its ability will last almost forever.

Although the present invention has been described by referring to several particular preferred embodiments thereof, it should be understood that various changes and modifications may be made without departing from the spirit and scope of the invention as defined in the appended claims.

What is claimed is:

1. An electromagnetic wave shield material composition comprising:

a primary element including a first mixture composed of 10 to 90% by weight of silicone resin and 90 to 10% by weight of baked ceramics material; and a secondary element including a second mixture composed of aluminum powder and/or stainless metal powder.

2. An electromagnetic wave shield material composition comprising:

a primary element including a first mixture composed of 10 to 90% by weight of silicone resin and 90 to 10% by weight of baked ceramics material; and a secondary element including a second mixture composed of aluminum powder and/or stainless metal powder, said secondary element having the proportion of 3 to 10% by weight with regard to said primary element.

3. The electromagnetic wave shield material composition as defined in claim 1 or 2, wherein said second mixture includes 10 to 90% by weight of aluminum powder and 90 to 10% by weight of stainless metal powder.

4. The electromagnetic wave shield material composition as defined in any one of claim 1 or claim 2, wherein said stainless metal powder is at least one selected from the group consisting of platinum powder, platinum compound powder, stainless steel powder, titanium powder and magnesium powder.

5. The electromagnetic wave shield material composition as defined in claim 1 or 2, wherein said baked ceramics material is at least one selected from the group consisting of granite, basalt, and sand, and wherein said baked ceramics material is obtained by baking said granite, basalt and/or sand at 650 degrees ° C. to 1200 degrees ° C. for six or more hours and allowing the same to cool to the ambient temperature, and by repeating the preceding steps at least one more time under the same conditions.

6. An electromagnetic wave shield thin sheet comprising the electromagnetic wave shield material composition as defined in any one of claim 1 or 2.

7. An electromagnetic wave shield thin sheet comprising the electromagnetic wave shield material composition as defined in any one of claims 1 or 2, said thin sheet having a thin aluminum film layer deposited on one side thereof.

8. An electromagnetic wave shield material composition comprising:

a primary element including a first mixture composed of 10 to 90% by weight of silicone resin and 90 to 10% by weight of baked ceramics material; and a secondary element including a second mixture composed of paint and at least one selected from the group consisting of aluminum powder and stainless metal powder.

9. An electromagnetic wave shield material composition comprising:

a primary element including a first mixture composed of 10 to 90% by weight of silicone resin and 90 to 10% by weight of baked ceramics material; and a secondary element including a second mixture composed of paint and at least one selected from the croup consisting of aluminum powder and stainless metal powder, said secondary element having the proportion of 3 to 10% by weight with regard to said primary element.

10. The electromagnetic wave shield material composition as defined in claim 8 or 9, wherein said second mixture includes 10 to 90% by weight of paint and 90 to 10% by weight of aluminum powder or stainless metal powder.

11. The electromagnetic wave shield material composition as defined in claim 8 or 9, wherein said second mixture includes 10 to 80% by weight of paint, 10 to 80% by weight of aluminum powder, and 10 to 80% by weight of stainless metal powder.

12. The electromagnetic wave shield material composition as defined in any one of claims 8 or 9, wherein said stainless metal powder is at least one selected from the group consisting of platinum powder, platinum compound powder, stainless steel powder, titanium powder, and magnesium powder.

13. The electromagnetic wave shield material composition as defined in any one of claims 8 or 9, wherein said baked ceramics material is at least one selected from the group consisting of granite, basalt and sand, and wherein said baked ceramics material is obtained by baking said granite, basalt and/or sand at 650 degrees C to 1200 degrees C for six or more hours and allowing the same to cool to the ambient temperature, and by repeating the preceding steps at least one more time under the same conditions.

14. An electromagnetic wave shield thin sheet comprising the electromagnetic wave shield material composition as defined in any one of claims 8 or 9, wherein it is shaped into a thin sheet by using electromagnetic wave shield material composition.

15. An electromagnetic wave shield thin sheet comprising the electromagnetic wave shield material composition as defined in any one of claims 8 or 9, said thin sheet having an thin aluminum film layer deposited on one side thereof.

* * * * *